March 8, 1927.  
C. W. FREDERICK  
PROJECTION SYSTEM  
Filed Aug. 4, 1925
1,620,338
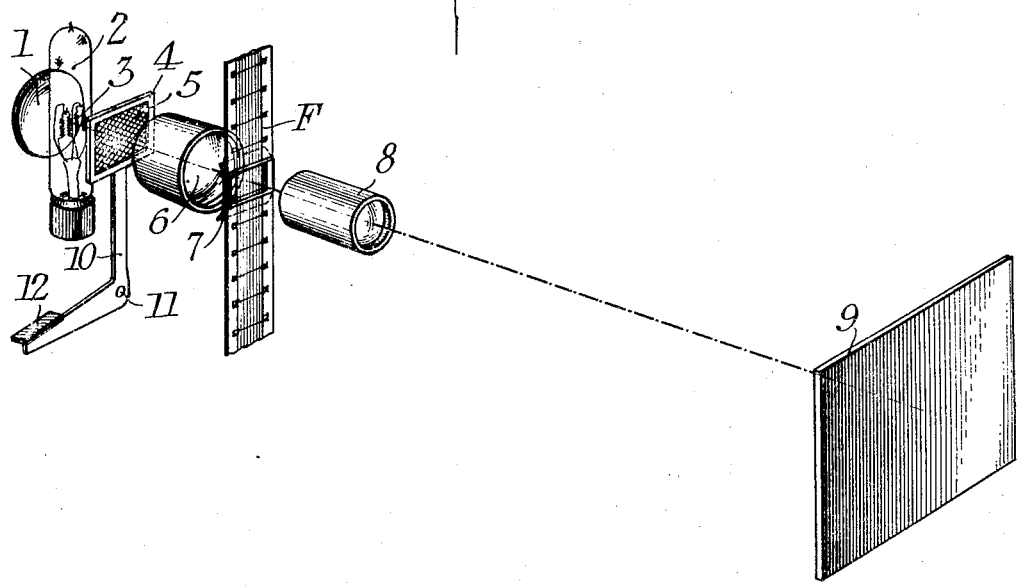
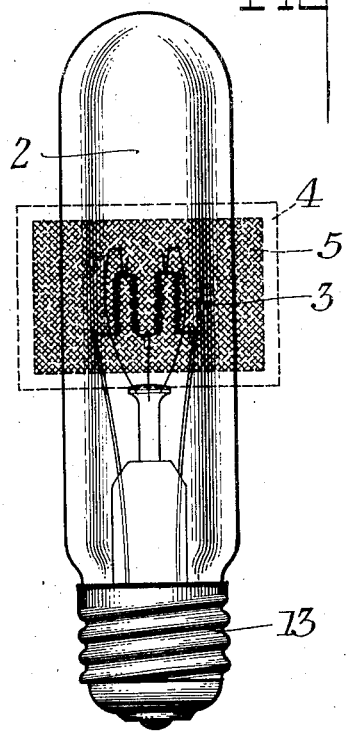
Charles W. Frederick,
INVENTOR.
BY R. L. Stinchfield
N. M. Perrins
ATTORNEYS.

Patented Mar. 8, 1927.

1,620,338

UNITED STATES PATENT OFFICE.

CHARLES W. FREDERICK, OF ROCHESTER, NEW YORK, ASSIGNOR TO EASTMAN KODAK COMPANY, OF ROCHESTER, NEW YORK, A CORPORATION OF NEW YORK.

PROJECTION SYSTEM.

Application filed August 4, 1925. Serial No. 48,160.

This invention relates to apparatus for the projection of transparencies, and more particularly to an improvement in apparatus for projecting from a piece of motion picture film while it is held stationary at the projection gate. The usual source of light for projectors, particularly of the portable type for home use, is an incandescent lamp having parallel bands of light. When projecting from the stationary film, it is necessary to interpose a heat absorbing screen. One of the types of such a screen is a metal wire net. When this net is mounted in the obvious or natural arrangement with its strands parallel to its frame, and therefore parallel to the bands, it has been found that diffraction effects are produced which are annoying and render the illumination uneven. I have found that these may be avoided by arranging this net with the strands oblique to the bands of the light source.

Reference will now be made to the accompanying drawing in which,—

Fig. 1 shows the necessary elements of a projection system included in my invention;

Fig. 2 is an elevation of a lamp and a screen in alignment;

A typical projection system comprises a reflector 1 behind the incandescent lamp 2, having filaments 3 from which light is projected by the condenser 6 through the gate 7 at which there is a film F carrying an image which is projected by the objective 8 upon the screen 9. As shown, the filaments 3 are of the usual type consisting of parallel spirals of wire, which, when luminous constitute a banded light source. The lamp has the usual screw plug 13 by which it is attached to a suitable socket. Between the lamp and the gate I provide a safety screen consisting of a frame 4 within which there is a copper cloth or net work 5, the frame being carried by an elbow lever 10 pivoted at 11 and having an operating handle 12.

It is to be understood that this screen is removed from operative position when the film is passed through the gate in ordinary motion picture work, and that it is moved to the position shown when the film stops. The screen serves to cut down the illumination upon the film but permits enough light to pass to illuminate it sufficiently for projection purposes. The metal screen, secured in a metallic frame, dissipates the heat rays intercepted by the screen.

By arranging the strands of the netting oblique to the bands of light, objectionable diffraction effects are avoided, and even illumination is obtained.

Having thus described my invention, what I claim as new and desire to secure by Letters Patent is:

1. In a projecting system, a gate whereat an image bearing element may be positioned, a source of light of the straight band type, for illuminating said gate, and a heat absorbing screen positioned between the source of light and the gate and comprising a metallic net work, the strands of which are inclined with respect to the straight band formation of the light source.

2. In a projecting system, a gate whereat an image bearing element may be positioned, a source of light comprising a plurality of parallel, luminous bands for illuminating said gate, and a heat absorbing screen positioned between the source of light and the gate and comprising a metallic net work, the strands of which are inclined with respect to the direction of the bands.

3. In a projecting system, a source of light of the straight band type, a projection gate for the positioning of an image bearing element, optical means for directing light from the lamp upon the gate and for projecting the image thus illuminated upon a screen, and a heat absorbing screen positioned between the source of light and the gate and comprising a metallic net work the strands of which are inclined with respect to the straight band formation of the light source.

4. In a projecting system, a gate whereat an image bearing transparency liable to be deleteriously affected by light may be positioned, a source of light comprising a plurality of luminous parallel bands for illuminating said gate, an optical system for projecting a concentrated beam of light from said source through said gate to illuminate an image thereat, and a heat absorbent screen in said beam between the light and the gate and comprising a metallic net work the strands of which are oblique to the bands.

5. In a projecting system, a gate whereat an image bearing element may be positioned, a source of light of the straight band type, a condenser directing light from said source through the gate and illuminating the gate with substantial uniformity, and a heat absorbing screen adapted to be positioned between the source of light and the gate and comprising a metallic net work, the strands of which, when in position, are inclined to the straight band formation of the light source.

Signed at Rochester, New York, this 30 day of July, 1925.

CHARLES W. FREDERICK.